United States Patent
Jiang et al.

(10) Patent No.: US 10,187,455 B2
(45) Date of Patent: Jan. 22, 2019

(54) AUTOMATED NETWORK CONNECTION SHARING

(71) Applicant: Microsoft Technology Licensing, LLC, Redmond, WA (US)

(72) Inventors: Naiyi Jiang, Bellevue, WA (US); Robert Zhu, Bellevue, WA (US); Qian Zhou, Sammamish, WA (US); Ying N Chin, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 182 days.

(21) Appl. No.: 15/008,387

(22) Filed: Jan. 27, 2016

(65) Prior Publication Data
US 2017/0034253 A1 Feb. 2, 2017

Related U.S. Application Data

(60) Provisional application No. 62/197,989, filed on Jul. 28, 2015.

(51) Int. Cl.
*H04L 12/901* (2013.01)
*H04L 29/08* (2006.01)
(Continued)

(52) U.S. Cl.
CPC ............ *H04L 67/10* (2013.01); *H04L 67/143* (2013.01); *H04W 4/023* (2013.01); *H04W 4/80* (2018.02); *H04W 12/08* (2013.01)

(58) Field of Classification Search
CPC .......... H04L 67/10; H04W 4/008; H04W 4/02
See application file for complete search history.

(56) References Cited

U.S. PATENT DOCUMENTS

| 7,944,901 B2 | 5/2011 | Souissi et al. |
| 8,351,335 B2 | 1/2013 | Lin et al. |

(Continued)

FOREIGN PATENT DOCUMENTS

| CN | 102970766 A | 3/2013 |
| CN | 103269521 A | 8/2013 |

(Continued)

OTHER PUBLICATIONS

Heath, Alex. "MyWi "OnDemand" Brings Intelligent Hotspot Functionality to the iPhone." Posted at <http://www.idownloadblog.com/2011/02/05/mywi-ondemand-brings-intelligent-hotspot-functionality-to-the-iphone/> on Feb. 5, 2011.*

(Continued)

*Primary Examiner* — Scott B Christensen
(74) *Attorney, Agent, or Firm* — Scott Y. Shigeta; Newport IP, LLC

(57) ABSTRACT

Concepts and technologies are described herein for providing automated network connection sharing. Techniques disclosed herein can initiate Internet connection sharing between a first computer and a second computer, wherein the Internet connection sharing enables the first computer to function as a host to provide Internet access to the second computer. If there is a break in the connection, a system determines if the second computer is in proximity to the first computer. If it is determined that the first computer is in proximity to the second computer, the techniques disclosed herein verify access rights. Once the access rights are verified, the system automatically establishes Internet connection sharing between the first computer and the second computer. The techniques disclosed herein enable access to a service for sharing a network connection without requiring user interaction.

17 Claims, 4 Drawing Sheets

(51) Int. Cl.
*H04W 4/80* (2018.01)
*H04W 4/02* (2018.01)
*H04W 12/08* (2009.01)

(56) References Cited

U.S. PATENT DOCUMENTS

| | | | |
|---|---|---|---|
| 2010/0069004 A1 | 3/2010 | Bloebaum | |
| 2011/0082933 A1 | 4/2011 | Zhou et al. | |
| 2013/0145407 A1 | 6/2013 | Han et al. | |
| 2014/0235167 A1 | 8/2014 | Jung et al. | |
| 2014/0254799 A1 | 9/2014 | Husted et al. | |
| 2015/0003432 A1 | 1/2015 | Tanaka | |
| 2016/0072804 A1* | 3/2016 | Chien | H04L 63/0807 726/4 |
| 2016/0163138 A1* | 6/2016 | Turner | H04W 4/029 340/5.7 |

FOREIGN PATENT DOCUMENTS

| | | |
|---|---|---|
| CN | 104283991 A | 1/2014 |
| KR | 20140054914 A | 5/2014 |
| WO | WO2013/178254 A1 | 12/2013 |
| WO | 2015057116 A1 | 4/2015 |

OTHER PUBLICATIONS

"Written Opinion Issued in PCT Application No. PCT/US2016/042377", dated May 22, 2017, 7 Pages.

Allsopp, Ashleigh, "Automatically connect to BT WiFi hotspots on your iPhone, iPad", published on Dec. 18, 2012, available at: http://www.macworld.co.uk/news/pad/automatically-connect-bt-wifit-hotspots-your-phone-ipad-3494345/.

Chen, Kent, "How to Turn Your Windows 8 Computer into a Wireless Hotspot Access Point", Published Jun. 18, 2012, available at: http://www.nextofwindows.com/how-to-turn-your-windows-8-computer-into-a-wireless-hotspot-access-point/, 8 pages.

Optimum.Net, "Automatically sign-In to WiFi—Optimum", published on Apr. 24, 2015, available at: https://www.optimum.net/internet/auso-signin, 3 pages.

Padilla, Richard, "How to Use 'Instand Hotspot' on a Mac with OS X Yosimite", published on Oct. 22, 2014, available at: http://www.macrumors.com/2014/10/23/hot-to-instant-hotspot/, 9 pages.

Play.google, "Keep in Pocket (Remote Tether)", Published on: Sep. 27, 2013, available at https://play.google.com/store/apps/details?id=net.momodalo.app.KeepInPocket, 3 pages.

Support.apple.com, "Share your Internet connection with Personal Hotspot", retreived on Jun. 3, 2015, available at: https://support.apple.com/en-in/HT2024023, 3 pages.

Wonderhowto, "Samsung Galaxy X5: Automoatically Turn on and of Wifi Connection"; Published on Sep. 6, 2014, available http://gs5.wonderhow.com/forum/samsung-galaxy-s%-automatically-turn-and-off-wifi-connection-0157199/, 4 pages.

"International Search Report and Written Opinion Issued in PCT Application No. PCT/US2016/042377", dated Oct. 5, 2016, 13 Pages.

"International Preliminary Report on Patentability Issued in PCT Application No. PCT/US2016/042377", dated Aug. 14, 2017, 8 Pages.

* cited by examiner

AUTOMATED NETWORK CONNECTION SHARING

CROSS-REFERENCE TO RELATED APPLICATION

This application claims the benefit of U.S. Provisional Patent Application Ser. No. 62/197,989 filed on Jul. 28, 2015, entitled "AUTOMATED NETWORK CONNECTION SHARING," the entirety of which is expressly incorporated herein by reference.

BACKGROUND

Internet Connection Sharing involves the use of a host device, such as a smart phone, with Internet access. Other client devices, such as a Bluetooth car kit or a personal computer, may connect to the host device, which may function as an access point for the client devices to access the Internet. Traditionally, Internet Connection Sharing requires users to manually configure the host device each time they wish to provide Internet access to a client device. Such configurations are inconvenient because they require one or more manual steps to enable Internet Connection Sharing on the host device. Scenarios where a car kit may access the Internet through a phone may create unnecessary distraction to a driver. Instead of focusing on driving, the driver may need to look away from the road to manually configure their phone or a host device.

It is with respect to these and other considerations that the disclosure made herein is presented.

SUMMARY

Technologies are described herein for providing automated network connection sharing. Techniques disclosed herein can initiate Internet connection sharing between a first computer and a second computer, wherein the Internet connection sharing enables the first computer to function as a host to provide Internet access to the second computer. If there is a break in the connection, a system determines if the second computer is in proximity to the first computer. If it is determined that the first computer is in proximity to the second computer, the techniques disclosed herein verify access rights. Once the access rights are verified, the system automatically establishes Internet connection sharing between the first computer and the second computer. The techniques disclosed herein enable access to a service for sharing a network connection without requiring user interaction.

It should be appreciated that the above-described subject matter can also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
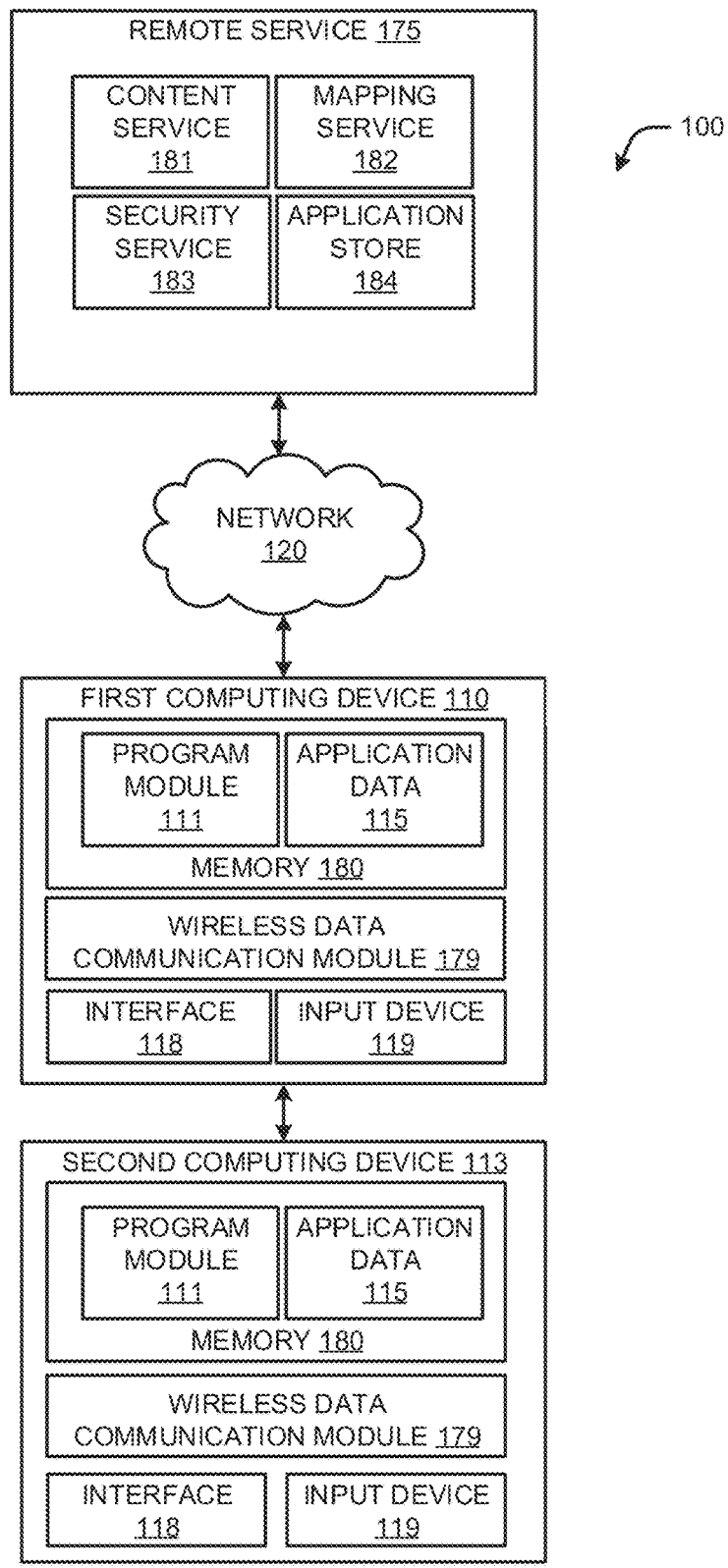
FIG. 1 is a block diagram showing several example components for providing automated network connection sharing for computing devices.

Concepts and technologies are described herein for providing automated network connection sharing. As will be described herein, configurations disclosed herein enable a host device to automatically provide Internet connection sharing to one or more client devices. In some configurations, techniques disclosed herein can initiate Internet connection sharing between a first computer and a second computer, wherein the Internet connection sharing enables the first computer to function as a host to provide Internet access to the second computer. The Internet connection sharing may be established by pairing the first computer with the second computer using a wireless or wired technologies. The system then determines if the Internet connection sharing is to be disconnected. The Internet connection sharing may be disconnected, for instance, if the host device moves out of range or if the connection times out.

If the Internet connection sharing is disconnected, the techniques disclosed herein determine if the Internet connection sharing is to be reinitiated. One or more techniques may be used to determine if the Internet connection sharing is to be reinitiated. For instance, a wireless control module can indicate if the first computer is in proximity to the second computer. As will be described in more detail below, a number of techniques may be used to determine if the Internet connection sharing is to be reinitiated.

If it is determined that the Internet connection sharing is to be reinitiated, the techniques disclosed herein can verify access rights. In some configurations, access rights may be based on one or more techniques, which may involve one or more authentication techniques or other techniques for verifying access rights. For example, during the initial pairing, if the first computer and the second computer are paired using a wireless technology, such as Bluetooth, the techniques disclosed herein may maintain records of such a pairing. Access right may be verified if one or more records indicate that the devices have been previously paired. Once the access rights are verified, the system automatically establishes Internet connection sharing between the first computer and the second computer. It can be appreciated that implementations may not verify the access rights and thus allow an automatic connection based, at least in part, on the proximity of the devices.

By providing techniques for providing automated network connection sharing, techniques improve a user's interaction with a computing device. For instance, if a mobile phone is utilized as a host providing Internet access to another system, such as a hotspot device in a vehicle, the techniques disclosed herein mitigate the need for a user to interact with the device to enable a shared Internet connection or a connection with another network.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements throughout the several figures, aspects of a computing system and methodology for providing automated network connection sharing will be described. Although the examples disclosed herein include Internet connection sharing, it can be appreciated that the techniques disclosed herein may apply any type of network connection that enables communication between multiple computing devices.

FIG. 1 is a system diagram showing aspects of one illustrative mechanism disclosed herein for providing automated network connection sharing. As shown in FIG. 1, a system 100 may include a first computing device 110, a second computing device 113, and a network 120. In this example, the first computing device 110 functions as a host to provide Internet access or network access to the second computer 113. The first computing device 110 may be connected to one or more local and/or wide area networks, such as the network 120. In some configurations, the first computing device 110 may be in communication with the network 120 through a service, which may include a wired or wireless connection to the Internet. The first computing device 110, and by techniques described herein, the second computing device 113 can access one or more remote services and resources, such as a remote service 175. As will be described below, the remote service 175 may provide a number of services, such as a content service 181, a mapping service 182 and a security service 183. Other data and applications can also be provided by an application store 184. This example is provided for illustrative purposes and is not to be construed as limiting as it can be appreciated that the system 100 may include many more computing devices shown in FIG. 1.

By the use of one or more technologies, the first computing device 110 functions as a host to provide Internet access to the second computing device 113. The connection between the first computing device 110 and the second computing device 113 may be established by the use of a wired or wireless technology. One or more protocols, such as Bluetooth or Wi-Fi, may be utilized in the connection between the first computing device 110 and the second computing device 113. It should be appreciated that many more network connections may be utilized than illustrated in FIG. 1.

The first computing device 110 may be in the form of a personal computer, a tablet, a phone, a wearable computer, including a HMD, or any other device having components for accessing a network 120, such as the Internet, and providing another computer, such as the second computing device 113, access to the network 120. The second computing device 113, may be in the form of any computer that may utilize access to a network 120 such as the Internet. For example, the second computing device 113 may be a personal computer, a tablet, a phone, a wearable computer, or a specialized device such as a wireless hotspot.

In some configurations, the second computing device 113 can include one or more components of a vehicle or one or more components that interact with a vehicle. For illustrative purposes, the second computing device 113 can include a "car kit" configured to access content from one or more resources, such as the remove service 175. In such configurations and other configurations, the second computing device 113 can be configured to access data, such as audio and video data, provided by a service, such as the content service 181. Access to content may be subscription-based and can be controlled by one or more authentication techniques.

The second computing device 113 can be configured to receive map data from a resource, such as the mapping service 182, and display the map data for navigational purposes. In such configurations, second computing device 113 be configured to download map data from one or more services, such as GOOGLE maps, BING maps and/or other resources. The map data can be displayed on an interface of the second computing device 113 or an interface attached to a vehicle. The second computing device 113 can interpret the map data and generate one or more navigational instructions. The instructions may be displayed on an interface or provided by an output device, such as a speaker, in the form of a voice instruction.

The second computing device 113 can also access the application store 184 for accessing customized applications to be executed by the second computing device 113. The applications may provide access to other content, such as news, music, videos and other data provided by a resource, such as the remote service 175. The applications and/or the second computing device 113 can be configured to control one or more components of a vehicle. For example, the second computing device 113 can start the engine of a vehicle, activate and control the climate control system, or control any aspect of a vehicle, the first computing device 110, or other systems in communication with the second computing device 113.

In yet another example, the second computing device 113 can control security features of a vehicle. For example, the second computing device can lock and unlock the doors of a vehicle, sound an alarm, and control communications with one or more services, such as the security service 183. The second computing device 113 can be configured to receive alerts from one or more services, and take action based on the alerts. In one illustrative example, an alert may provide notice of a storm, and in such scenarios, the navigational features of the second computing device 113 can change a route and/or provide a notice to a user. The second computing device 113 can initiate and manage other forms of communication, such as phone calls, an IP-based calls, text messages, emails, etc.

The second computing device 113 can also include an identifier, which can be stored in the application data 115. The application data 115 containing the identifier can be communicated by a wireless data communication module 179 to a remote device, such as the first computing device 110 to enable the first computing device 110 to validate access rights of the second computer 113. The wireless data communication module 179 can include one or more technologies, such as Bluetooth technologies, for determining if the second computing device 113 is in proximity to the first computing device 110.

The first computing device 110 and the second computing device 113 can include a local memory 180 that stores application data 115. For instance, authentication information, pairing information and other data may be stored in the application data 115. The application data 115 may also store user profile data, which may indicate a user's preferences and other information used for providing automated network connection sharing. For instance, the application data 115 may store a history log of all client devices that have established a Bluetooth pairing with the first computing device 110 or the second computing device 113. The application data 115 can be used by a wireless data communication module 179 to determine if a remote device has valid credentials for reinitiating a connection. The wireless data communication module 179 can include one or more technologies, such as Bluetooth technologies, for determining if a remote computer is in proximity to the first computing device 110.

The first computing device 110 and the second computing device 113 (also referred to herein collectively and generically as "computers" or "computing devices") can include a program module 111 configured to manage techniques described herein and interactions with a user. A user may interact with the first computing device 110 or the second computing device 113 by the use of an interface 118, which may include a touchscreen display or any other type of display for rendering display data to a user. In addition, each computing device may include an input device 119, such as a keyboard, microphone, or any other type of device for receiving an input from a user. The program module 111 may be in the form of an operating system component or any other application configured to manage one or more network communication connections. The terms "first" and "second" are used herein to distinguish one device from another device, such terms are not to infer a priority, sequence or functionality associated with a particular device.

Figure 2:
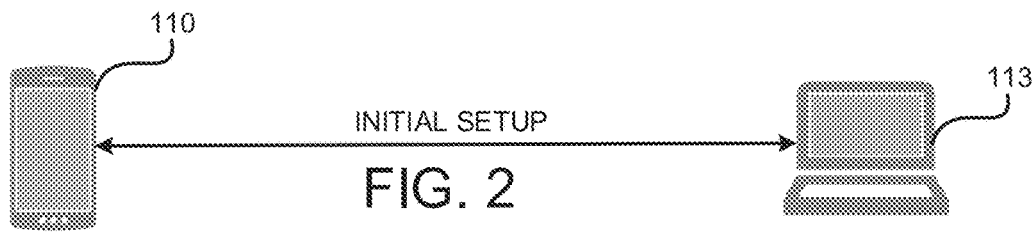
FIG. 2 illustrates an example diagram showing two computers engaged in an initial setup process.

The computers may also operate in conjunction with a remote computer (not shown) for implementing aspects of the techniques disclosed herein. For instance, the application data 115 may be stored on a server, and aspects of the techniques disclosed herein may be implemented on a server or provided by a cloud service. To illustrate aspects of the techniques disclosed herein, FIGS. 2-4 illustrate a series of states the computing devices may utilize to carry out aspects of the techniques disclosed herein.

As summarized above, an Internet sharing connection may be established between the first computer 110 and the second computer 113. FIG. 2 illustrates one example of an initial setup, also referred to as an initial paring. This initial setup may utilize a number of technologies, such as Bluetooth, Wi-Fi or any other wired or wireless technology. In one example, the initial setup shown in FIG. 2 may be established by pairing the first computer 110 to the second computing device 113 using Bluetooth-based technologies. This example is provided for illustrative purposes and is not to be construed as limiting. Once the computing devices are paired, techniques disclosed herein may store application data 115 to maintain records of the pairings. Either computer can store an identifier for the other computer. As will be described in more detail below, such information may be used to verify access rights, which may be part of an automated process for reinitiating a connection between the devices.

Figure 3A:
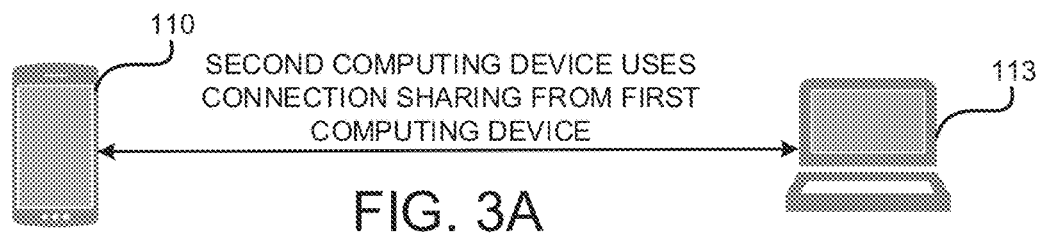
FIGS. 3A-3B illustrate example diagrams showing the two computers utilizing a shared network connection and a break in the connection.
Figure 4:
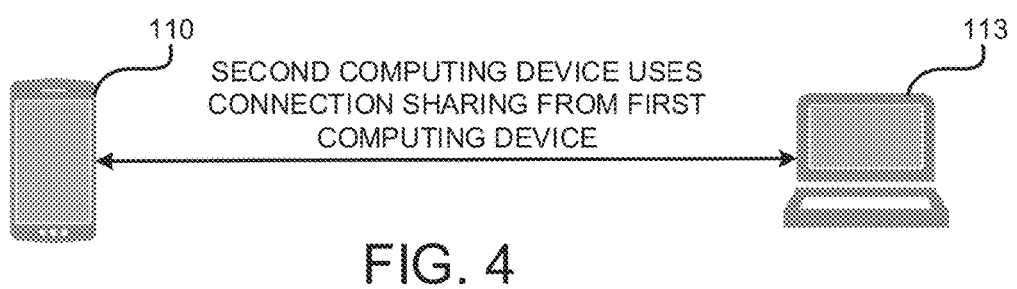
FIG. 4 illustrates an example of two computers reestablishing a shared network connection after the break in the connection.

As shown in FIG. 3A, after the initial setup, the first computing device 110 enters a mode that provides Internet access or network access to the second computing device 113. It can be appreciated that the connection established between the two devices may utilize any protocol. For illustrative purposes, when the first computing device 110 provides Internet access to the second computing device 113 the first computing device 110 provides "Internet connection sharing" to the second computing device 113.

Figure 3B:
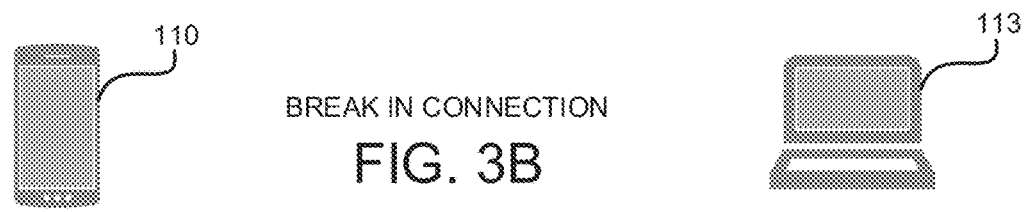

Next, as shown in FIG. 3B, the system may determine that the Internet connection sharing is to be disconnected. The Internet connection sharing may be disconnected based on one or more scenarios. For instance, if the two computers are separated to a point where a wireless connection between the two devices are out of range, the techniques disclosed herein may disconnect or discontinue the Internet connection sharing. In addition, in other scenarios, such as a network timeout or a user-initiated disconnect command may cause the devices to disconnect or discontinue the Internet connection sharing. These examples are provided for illustrative purposes and are not to be construed as limiting.

Next, as shown in FIG. 4, when the Internet connection sharing is to be reinitiated, the techniques disclosed herein automatically reinitiates the Internet connection sharing between the first computer 110 and the second computer 113. As will be described in more detail below, the Internet connection sharing can be reinitiated if the computers are within a predetermined distance from one another. The distances can be determined by the use of one or more location services, such as a GPS device providing location data. In other configurations, the Internet connection sharing can be reestablished if the first computing device 110 and the second computing device 113 are within a range that allows for wireless data communication between the two computing devices. In addition, as described herein, techniques disclosed herein may also involve the verification of access rights, which can provide security and controlled access to the host device.

Figure 5:
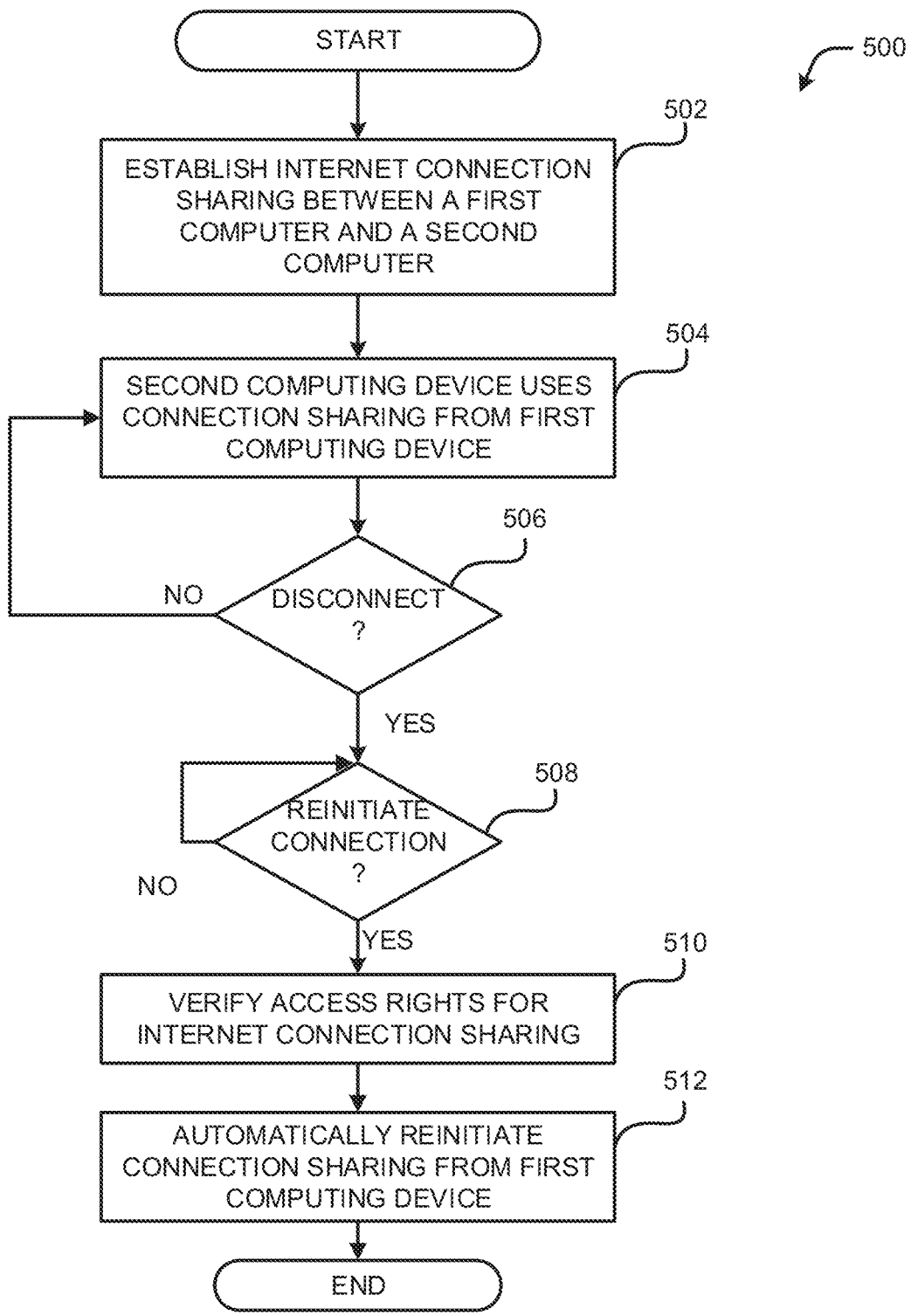
FIG. 5 is a flow diagram illustrating a routine that can be used for providing automated network connection sharing for computing devices.

Turning now to FIG. 5, aspects of a routine 500 for providing automated network connection sharing are shown and described below. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in its entirety. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

As will be described in more detail below, in conjunction with FIG. 1, the operations of the routine 500 are described herein as being implemented, at least in part, by an application, component and/or circuit, such as the program module 111. Although the following illustration refers to the components of FIG. 1, it can be appreciated that the operations of the routine 500 may be also implemented in many other ways. For example, the routine 500 may be implemented, at least in part, by computer processor or processor of another computer. In addition, one or more of the operations of the routine 500 may alternatively or additionally be implemented, at least in part, by a chipset working alone or in conjunction with other software modules. Any service, circuit or application suitable for providing contextual data indicating the position or state of any device may be used in operations described herein.

With reference to FIG. 5, the routine 500 begins at operation 502, where the program module 111 of one or more computers establishes Internet connection sharing between the first computer 110 and the second computer 113. In some configurations, operation 502 may involve an initial setup between the computers. This initial setup may utilize a number of technologies, such as Bluetooth, Wi-Fi or any other wired or wireless technology. In one example, the initial setup shown in FIG. 2 may be established by pairing the first computer 110 to the second computing device 113 using Bluetooth technologies. This example is provided for illustrative purposes and is not to be construed as limiting.

Next, at operation 504, the first computing device 110 enters a sharing mode that provides Internet access or network access to the second computing device 113. It can be appreciated that the communication connection established between the two devices may utilize any protocol. As summarized above, communication between the two computers may involve BLUETOOTH, Wi-Fi or any other wired or wireless technology.

As shown in operation 506, the routine 500 may involve one or more mechanisms that enable the computing devices to suspend or disconnect the Internet access or network access for the second computing device 113. One or more existing technologies may be utilized to make this determination. For instance, the connection between the computers may be disconnected or suspended if the connection or the Internet connection sharing is not used for a period of time. One or more thresholds, e.g., a predetermined number of seconds or minutes, may be used to determine if a connection should be disconnected or suspended. The techniques disclosed herein may also consider other factors. For example, the computing devices may fall out of range from one another. One or more sensors or a threshold, such as a signal strength, may be used to determine if the connection should be terminated. Other thresholds, such as a predetermined distance between the computers, may be used to determine if a connection should be disconnected or suspended.

As shown in operation 508, if it is determined that the computing devices should suspend or disconnect the Internet access or network access for the second computing device 113, the routine 500 enters a mode where the first computing device 110 waits for an event to reinitiate the connection between the devices. As summarized herein, a number of factors may be used to determine if the computing devices should reinitiate the connection between the devices. For example, the connection between the devices and the Internet connection sharing can be reinitiated if the computers are within a predetermined distance from one another. In some configurations, the Internet connection sharing can be reinitiated if the first computing device 110 and the second computing device 113 are within a range that allows for wireless data communication between the two computing devices. Other factors, such as a signal strength, may be utilized to determine if the connection between the computers and the Internet connection sharing should be reinitiated. In such configurations, computing devices should reinitiate the connection between the devices when the signal strength between the two devices reaches a pre-determined threshold.

At operation 508, if it is determined that the Internet connection sharing should be reinitiated, the routine 500 continues to operation 510 where one or more computing devices verify access rights for the Internet connection sharing. As summarized above, techniques disclosed herein may analyze stored data, such as the application data 115, to determine if the two devices have been previously paired using one or more technologies, such as Bluetooth. In addition, other security measures or other stored information may be utilized to determine if the second computing device 113 may access an Internet connection or a network through the first computing device 110. In addition, contextual information or security data received from other devices may be utilized to verify access rights for the Internet connection sharing.

Aspects of operation 510 can also receive data from one or more resources, such as the remote service 175, to determine if the second computing device 113 can access an Internet connection or a network through the first computing device 110. In such configurations, security keys or other forms of authentication data can be received form a service, such as the security service 183, to determine if access is appropriate.

It can be appreciated that some operations, such as operation 510, may be optional. Thus, the routine 500 may include configurations where the process flow continues from operation 508 to operation 512. Next, at operation 512, the connection between the devices and the Internet connection sharing hosted by the first computing device 110 is automatically reinitiated.

Figure 6:
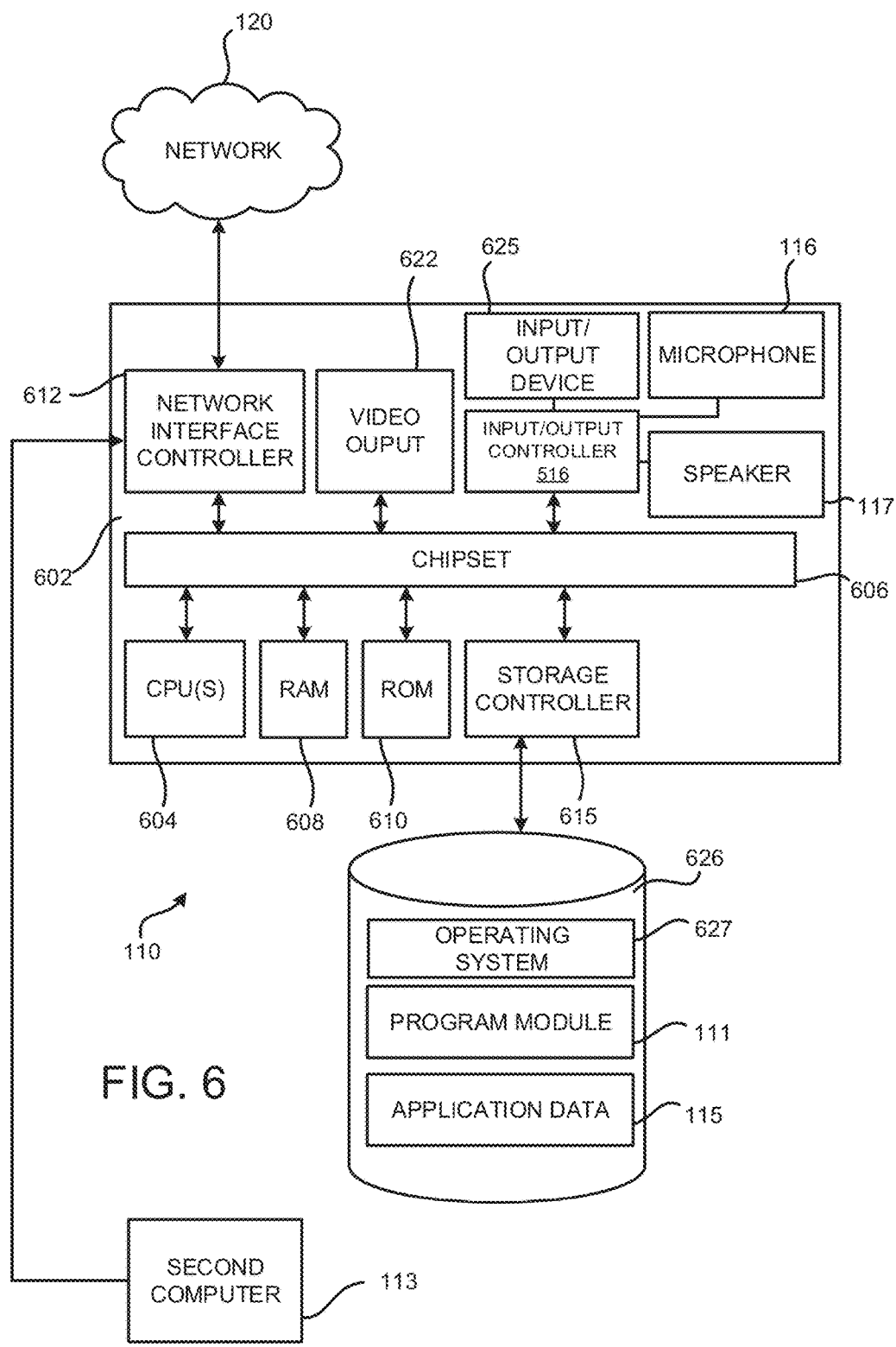
FIG. 6 is a computer architecture diagram illustrating an illustrative computer hardware and software architecture for a computing system capable of implementing aspects of the techniques and technologies presented herein.

FIG. 6 shows additional details of an example computer architecture for the components shown in FIG. 1 capable of executing the program components described above for providing automated network connection sharing. The computer architecture shown in FIG. 6 illustrates a game console, conventional server computer, workstation, desktop computer, laptop, tablet, phablet, network appliance, personal digital assistant ("PDA"), e-reader, digital cellular phone, or other computing device, and may be utilized to execute any of the software components presented herein.

For example, the computer architecture shown in FIG. 6 may be utilized to execute any of the software components described above. Although some of the components described herein are specific to the computing device 110, it can be appreciated that such components, and other components may be part of a remote computer (not shown).

The computing device 110 includes a baseboard 602, or "motherboard," which is a printed circuit board to which a multitude of components or devices may be connected by way of a system bus or other electrical communication paths. In one illustrative embodiment, one or more central processing units ("CPUs") 604 operate in conjunction with a chipset 606. The CPUs 604 may be standard programmable processors that perform arithmetic and logical operations necessary for the operation of the computing device 110.

The CPUs 604 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 may provide an interface to a RAM 608, used as the main memory in the computing device 110. The chipset 606 may further provide an interface to a computer-readable storage medium such as a read-only memory ("ROM") 610 or non-volatile RAM ("NVRAM") for storing basic routines that help to startup the computing device 110 and to transfer information between the various components and devices. The ROM 610 or NVRAM may also store other software components necessary for the operation of the computing device 110 in accordance with the embodiments described herein.

The computing device 110 may operate in a networked environment using logical connections to remote computing devices and computer systems through a network, such as the local area network 120. The chipset 606 may include functionality for providing network connectivity through a network interface controller (NIC) 612, such as a gigabit Ethernet adapter. The NIC 612 is capable of connecting the computing device 110 to other computing devices over the network 120. For illustrative purposes, the NIC 612 is also referred to herein as the wireless communication module. It can be appreciated that the NIC 612 may include the necessary circuitry for establishing wired or wireless communication between the computing device 110 and any other computer or network.

It should be appreciated that multiple NICs 612 may be present in the computing device 110, connecting the computer to other types of networks and remote computer systems. The network 120 allows the computing device 110 to communicate with remote services and servers. The NIC 612 or other components may be utilized to provide network or Internet access to the second computer 113.

The computing device 110 may be connected to a mass storage device 626 that provides non-volatile storage for the computing device. The mass storage device 626 may store system programs, application programs, other program modules, and data, which have been described in greater detail herein. The mass storage device 626 may be connected to the computing device 110 through a storage controller 615 connected to the chipset 606. The mass storage device 626 may consist of one or more physical storage units. The storage controller 615 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units. It should also be appreciated that the mass storage device 626, other storage media and the storage controller 615 may include MultiMediaCard (MMC) components, eMMC components, Secure Digital (SD) components, PCI Express components, or the like.

The computing device 110 may store data on the mass storage device 626 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 626 is characterized as primary or secondary storage, and the like.

For example, the computing device 110 may store information to the mass storage device 626 by issuing instructions through the storage controller 615 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 110 may further read information from the mass storage device 626 by detecting the physical states or characteristics of one or more particular locations within the physical storage units.

In addition to the mass storage device 626 described above, the computing device 110 may have access to other computer-readable media to store and retrieve information, such as program modules, data structures, or other data. Thus, although the program module 111, application data 115 and other modules are depicted as data and software stored in the mass storage device 626, it should be appreciated that these components and/or other modules may be stored, at least in part, in other computer-readable storage media of the computing device 110. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computing device 110.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computing device 110. For purposes of the claims, the phrase "computer storage medium," and variations thereof, does not include waves or signals per se and/or communication media.

The mass storage device 626 may store an operating system 627 utilized to control the operation of the computing device 110. According to one embodiment, the operating system comprises a gaming operating system. According to another embodiment, the operating system comprises the WINDOWS® operating system from MICROSOFT Corporation. According to further embodiments, the operating system may comprise the UNIX, ANDROID, WINDOWS PHONE or iOS operating systems, available from their respective manufacturers. It should be appreciated that other operating systems may also be utilized. The mass storage device 626 may store other system or application programs and data utilized by the computing device 110, such as the program module 111, application data 115 and/or any of the other software components and data described above. The application data 115 may store data generated by the program module 111. For instance, if a Bluetooth pairing is initiated between two computers, data characterizing such pairings may be stored in the application data 115. The mass storage device 626 might also store other programs and data not specifically identified herein.

In one embodiment, the mass storage device 626 or other computer-readable storage media is encoded with computer-executable instructions which, when loaded into the computing device 110, transform the computer from a general-purpose computing system into a special-purpose computer capable of implementing the embodiments described herein. These computer-executable instructions transform the computing device 110 by specifying how the CPUs 604 transition between states, as described above. According to one embodiment, the computing device 110 has access to computer-readable storage media storing computer-executable instructions which, when executed by the computing device 110, perform the various routines described above with regard to FIG. 5 and the other figures. The computing device 110 might also include computer-readable storage media for performing any of the other computer-implemented operations described herein.

The computing device 110 may also include one or more input/output controllers 616 for receiving and processing input from a number of input devices, such as a keyboard, a mouse, a microphone, a headset, a touchpad, a touch screen, an electronic stylus, or any other type of input device. Also shown, the input/output controllers 616 is in communication with an input/output device 625. The input/output controller 616 may provide output to a display, such as a computer monitor, a flat-panel display, a digital projector, a printer, a plotter, or other type of output device. The input/output controller 616 may provide input communication with other devices such as a microphone 116, a speaker 117, game controllers and/or audio devices. In addition, or alternatively, a video output 622 may be in communication with the chipset 606 and operate independent of the input/output controllers 616. It will be appreciated that the computing device 110 may not include all of the components shown in FIG. 6, may include other components that are not explicitly shown in FIG. 6, or may utilize an architecture completely different than that shown in FIG. 6.

The disclosure presented herein may be considered in view of the following clauses.

Clause A: A computer-implemented method, comprising: initiating an Internet connection sharing between a first computer and a second computer, wherein the Internet connection sharing enables the first computer to function as a host to provide Internet access to the second computer; determining, at the first computer, if the Internet connection sharing is to be disconnected; disabling the Internet access to the second computer if it is determined that the Internet connection sharing is to be disconnected; determining, at the first computer, if the Internet connection sharing is to be reinitiated; determining, at the first computer, if access rights for the Internet connection sharing are valid, in response to determining that the Internet connection sharing is to be reinitiated; and automatically reinitiating the Internet connection sharing between the first computer and the second computer, if the access rights for the Internet connection sharing are valid.

Clause B: The method of clause A, wherein the Internet connection sharing is to be reinitiated if the second computer is in proximity to the first computer.

Clause C: The method of clauses A-B, wherein the second computer is in proximity to the first computer if a first wireless data communication module of the first computer is capable of communicating data with a second wireless data communication module of the second computer.

Clause D: The method of clauses A-C, wherein the second computer is in proximity to the first computer if a signal strength between a first wireless data communication module of the first computer and a second wireless data communication module of the second computer meets or exceeds one or more thresholds.

Clause E: The method of clauses A-D, wherein the second computer is in proximity to the first computer if the second computer is within a predetermined distance from the first computer.

Clause F: The method of clauses A-E, wherein the second computer comprises a car kit, wherein data for the car kit is communicated to a remote host through the first computer.

Clause G: The method of clauses A-F, further comprising: storing at least one identifier of the second computer at the first computer in response to initiating the Internet connection sharing; and retrieving one or more identifiers from the second computer in response to determining that the Internet connection sharing is to be reinitiated, and wherein the access rights for the Internet connection sharing are determined to be valid if the at least one identifier stored at the first computer corresponds to the one or more identifiers retrieved from the second computer.

Clause H: A first computer, comprising: a processor; and a memory having computer-executable instructions stored thereupon which, when executed by the processor, cause the first computer to initiate an Internet connection sharing between the first computer and a second computer, wherein the Internet connection sharing enables the first computer to function as a host to provide Internet access to the second computer; determine if the Internet connection sharing is to be disconnected; disable the Internet access to the second computer if it is determined that the Internet connection sharing is to be disconnected; determine if the Internet connection sharing is to be reinitiated; determine if access rights for the Internet connection sharing are valid, in response to determining that the Internet connection sharing is to be reinitiated; and automatically reinitiate the Internet connection sharing between the first computer and the second computer, if the access rights for the Internet connection sharing are valid.

Clause I: The first computer of clause H, wherein the Internet connection sharing is to be reinitiated if the second computer is in proximity to the first computer.

Clause J: The first computer of clauses H-I, wherein the second computer is in proximity to the first computer if a first wireless data communication module of the first computer is capable of communicating data with a second wireless data communication module of the second computer.

Clause K: The first computer of clauses H-J, wherein the second computer is in proximity to the first computer if a signal strength between a first wireless data communication module of the first computer and a second wireless data communication module the second computer meets or exceeds one or more thresholds.

Clause L: The first computer of clauses H-K, wherein the second computer is in proximity to the first computer if the second computer is within a predetermined distance from the first computer.

Clause M: The first computer of clauses H-L, wherein the second computer comprises a car kit, wherein data for the car kit is communicated to a remote host through the first computer.

Clause N: The first computer of clauses H-M, wherein the computer-executable instructions cause the first computer to: store at least one identifier of the second computer at the first computer in response to initiating the Internet connection sharing; and retrieve one or more identifiers from the second computer in response to determining that the Internet connection sharing is to be reinitiated, and wherein the access rights for the Internet connection sharing are determined to be valid if the at least one identifier stored at the first computer corresponds to the one or more identifiers retrieved from the second computer.

Clause P: A first computer, comprising: a processor; and a memory having computer-executable instructions stored thereupon which, when executed by the processor, cause the first computer to initiate a network connection sharing between the first computer and a second computer, wherein the network connection sharing enables the second computer to function as a host to provide the first computer access to a network; determine if the network connection sharing is to be disconnected; disable the network access with the second computer if it is determined that the network connection sharing is to be disconnected; determine that the Internet connection sharing is to be reinitiated; communicate one or more identifiers from the first computer to the second computer, in response to determining that the Internet connection sharing is to be reinitiated; receive an indicator from the second computer that the first computer is authorized to access the network through the second computer; and automatically initiate the network connection sharing between the first computer and the second computer, in response to receiving the indicator from the second computer.

Clause Q: The first computer of clause P, wherein the Internet connection sharing is to be reinitiated if the second computer is in proximity to the first computer.

Clause R: The first computer of clauses P-Q, wherein the second computer is in proximity to the first computer if a first wireless data communication module of the first computer is capable of communicating data with a second wireless data communication module of the second computer.

Clause S: The first computer of clauses P-R, wherein the second computer is in proximity to the first computer if a signal strength between a first wireless data communication module of the first computer and a second wireless data communication module the second computer meets or exceeds one or more thresholds.

Clause T: The first computer of clauses P-S, wherein the second computer is in proximity to the first computer if the second computer is within a predetermined distance from the first computer.

Clause U: The first computer of clauses P-T, wherein the first computer comprises a car kit, wherein data for the car kit is communicated to a remote host through the second computer.

Based on the foregoing, it should be appreciated that technologies for providing automated network connection sharing are provided herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:
1. A computer-implemented method, comprising:
  initiating an Internet connection sharing session between a first computing device and a second computing device, wherein the Internet connection sharing session enables the first computing device to function as a host to provide Internet access to the second computing device;
  determining a distance between the first computing device and the second computing device based on location data obtained from a location device;
  determining, at the first computing device, that the Internet connection sharing session is to be disconnected;
  disabling the Internet access to the second computing device in response to determining that the Internet connection sharing session is to be disconnected, wherein the Internet connection sharing session is to be disconnected in response to determining that the distance between the second computing device and the first computing device exceeds a threshold distance;
  determining, at the first computing device, that the Internet connection sharing session is to be reinitiated, wherein the Internet connection sharing session is to be reinitiated when the distance between the second computing device and the first computing device is within the threshold distance;

determining, at the first computing device, that access rights for the Internet connection sharing session are valid, in response to determining that the Internet connection sharing session is to be reinitiated; and automatically reinitiating the Internet connection sharing session between the first computing device and the second computing device, in response to determining that the access rights for the Internet connection sharing session are valid.

2. The method of claim 1, wherein the second computing device comprises a car kit, wherein data for the car kit is communicated to a remote host through the first computing device.

3. The method of claim 1, further comprising:

storing at least one identifier of the second computing device at the first computing device in response to initiating the Internet connection sharing; and retrieving one or more identifiers from the second computing device in response to determining that the Internet connection sharing is to be reinitiated, and wherein the access rights for the Internet connection sharing are determined to be valid if the at least one identifier stored at the first computing device corresponds to the one or more identifiers retrieved from the second computing device.

4. The method of claim 1, wherein the second computing device is further configured to:

receive map data from a resource via the network connection sharing session;

interpret the map data to generate one or more navigational instructions; and deliver the one or more navigational instructions through an output device.

5. The method of claim 1, wherein the second computing device is further configured to control one or more security features of a vehicle.

6. The method of claim 5, wherein controlling one or more security features of the vehicle comprises:

receiving one or more alerts from one or more services via the network connection sharing session; and taking one or more actions based on the one or more alerts.

7. A first computing device, comprising:

a processor; and a memory having computer-executable instructions stored thereupon which, when executed by the processor, cause the first computing device to initiate an Internet connection sharing session between a first computing device and a second computing device, wherein the Internet connection sharing session enables the first computing device to function as a host to provide Internet access to the second computing device;

determining a distance between the first computing device and the second computing device based on location data obtained from a location device;

determine that the Internet connection sharing session is to be disconnected;

disable the Internet access to the second computing device in response to determining that the Internet connection sharing session is to be disconnected, wherein the Internet connection sharing session is to be disconnected in response to determining that the distance between the second computing device and the first computing device exceeds a threshold distance;

determine that the Internet connection sharing session is to be reinitiated, wherein the Internet connection sharing session is to be reinitiated when the distance between the second computing device and the first computing device is within the threshold distance;

determine that access rights for the Internet connection sharing session are valid, in response to determining that the distance between the second computing device and the first computing device is within the threshold distance; and automatically reinitiate the Internet connection sharing session between the first computing device and the second computing device, in response to determining that the access rights for the Internet connection sharing session are valid.

8. The first computing device of claim 7, wherein the second computing device comprises a car kit, wherein data for the car kit is communicated to a remote host through the first computing device.

9. The first computing device of claim 7, wherein the computer-executable instructions are configured to cause the first computing device to:

store at least one identifier of the second computing device at the first computing device in response to initiating the Internet connection sharing; and retrieve one or more identifiers from the second computing device in response to determining that the Internet connection sharing is to be reinitiated, and wherein the access rights for the Internet connection sharing are determined to be valid if the at least one identifier stored at the first computing device corresponds to the one or more identifiers retrieved from the second computing device.

10. The first computing device of claim 7, wherein the second computing device is further configured to:

receive map data from a resource via the network connection sharing session;

interpret the map data to generate one or more navigational instructions; and deliver the one or more navigational instructions through an output device.

11. The first computing device of claim 7, wherein the second computing device is further configured to control one or more security features of a vehicle.

12. The first computing device of claim 11, wherein controlling one or more security features of the vehicle comprises:

receiving one or more alerts from one or more services via the network connection sharing session; and taking one or more actions based on the one or more alerts.

13. A first computing device, comprising:

a processor; and a memory having computer-executable instructions stored thereupon which, when executed by the processor, cause the first computing device to initiate a network connection sharing session between the first computing device and a second computing device, wherein the network connection sharing session enables the second computing device to function as a host to provide the first computing device access to a network;

determine a distance between the first computing device and the second computing device based on location data obtained from a location device, wherein the distance is used only for determining disconnecting or reinitiating the Internet connection sharing session;

determine that the network connection sharing session is to be disconnected;

disable the network access with the second computing device in response to determining that the network connection sharing session is to be disconnected, wherein the Internet connection sharing session is to be disconnected in response to determining that the distance between the second computing device and the first computing device exceeds a threshold distance;

determine that the Internet connection sharing session is to be reinitiated, wherein the Internet connection sharing session is to be reinitiated when the distance between the second computing device and the first computing device is within the threshold distance;

communicate one or more identifiers from the first computing device to the second computing device, in response to determining that the Internet connection sharing is to be reinitiated;

receive an indicator from the second computing device that the first computing device is authorized to access the network through the second computing device; and automatically initiate the network connection sharing session between the first computing device and the second computing device, in response to determining that the access rights for the Internet connection sharing session are valid.

14. The first computing device of claim 13, wherein the first computing device comprises a car kit, wherein data for the car kit is communicated to a remote host through the second computing device.

15. The first computing device of claim 13, wherein the memory having further computer-executable instructions stored thereupon which, when executed by the processor, cause the first computer to:

receive map data from a resource via the network connection sharing session;

interpret the map data to generate one or more navigational instructions; and deliver the one or more navigational instructions through an output device.

16. The first computing device of claim 13, wherein the memory having further computer-executable instructions stored thereupon which, when executed by the processor, cause the first computing device to control one or more security features of a vehicle.

17. The first computing device of claim 16, wherein controlling one or more security features of the vehicle comprises:

receiving one or more alerts from one or more services via the network connection sharing session; and taking one or more actions based on the one or more alerts.

* * * * *